Figure 1:
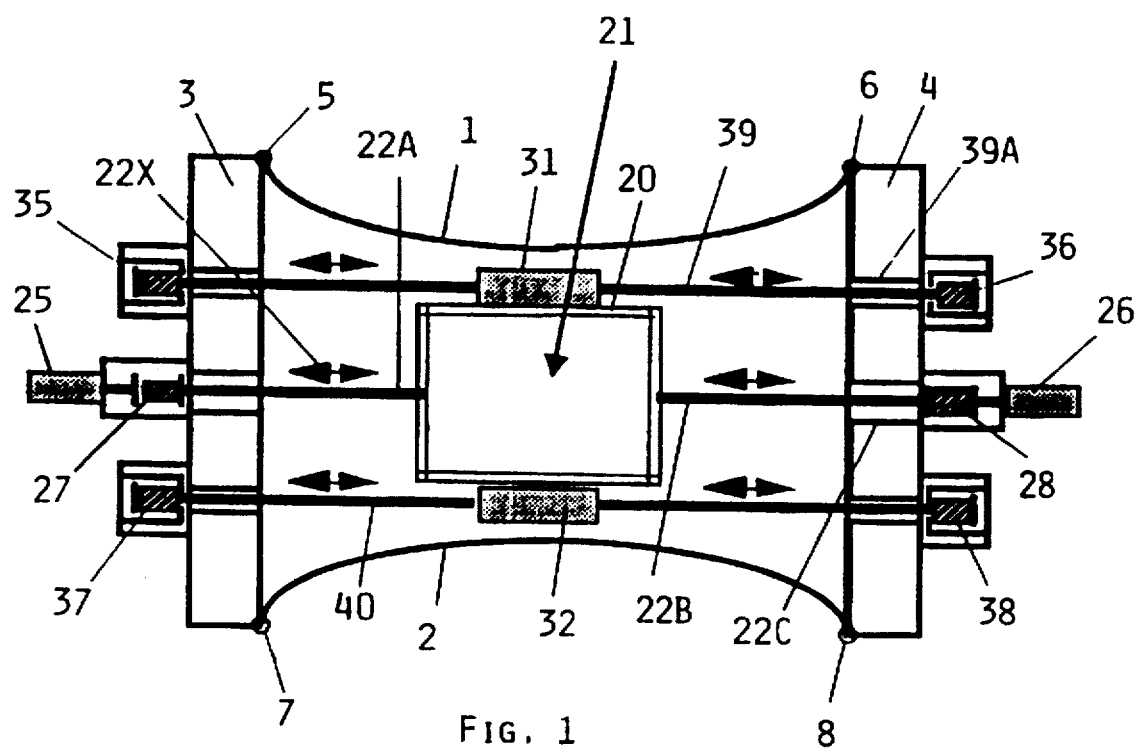

United States Patent [19]
Tenghamn et al.

[11] Patent Number: 5,757,728
[45] Date of Patent: May 26, 1998

[54] ACOUSTIC TRANSMITTER

[75] Inventors: Rune Tenghamn; Gunnar Molund; Magnus Zetterlund, all of Västerås, Sweden

[73] Assignee: Petroleum Geo-Services ASA-Norway, Lysaker, Norway

[21] Appl. No.: 737,022

[22] PCT Filed: May 5, 1995

[86] PCT No.: PCT/NO95/00071

§ 371 Date: Nov. 1, 1996

§ 102(e) Date: Nov. 1, 1996

[87] PCT Pub. No.: WO95/30911

PCT Pub. Date: Nov. 16, 1995

[30] Foreign Application Priority Data

May 6, 1994 [NO] Norway ............... 941708

[51] Int. Cl.⁶ ............................ H04R 17/00
[52] U.S. Cl. ............... 367/163; 363/174; 181/110; 310/337
[58] Field of Search ................. 367/163, 174, 367/15; 181/110; 310/337

[56] References Cited

U.S. PATENT DOCUMENTS

| | | | |
|---|---|---|---|
| 3,258,738 | 6/1966 | Merchant | 367/163 |
| 4,014,403 | 3/1977 | Mifsud | 181/114 |
| 4,483,411 | 11/1984 | Mifsud | 181/120 |
| 4,557,348 | 12/1985 | Mifsud | 181/120 |
| 4,578,784 | 3/1986 | Mifsud | 367/143 |
| 4,633,970 | 1/1987 | Mifsud | 181/120 |
| 4,764,907 | 8/1988 | Dahlstrom et al. | 367/163 |
| 4,862,429 | 8/1989 | Rolt | 367/165 |
| 4,864,548 | 9/1989 | Butler | 367/155 |
| 4,922,470 | 5/1990 | McMahon et al. | 367/163 |
| 4,932,008 | 6/1990 | Rolt | 367/165 |
| 4,964,106 | 10/1990 | Bromfield | 367/165 |
| 5,016,228 | 5/1991 | Arnold et al. | 367/163 |
| 5,136,556 | 8/1992 | Obara | 367/163 |
| 5,291,461 | 3/1994 | Boeglin et al. | 367/163 |
| 5,363,346 | 11/1994 | Maltby | 367/163 |

Primary Examiner—J. Woodrow Eldred
Attorney, Agent, or Firm—Gordon T. Arnold

[57] ABSTRACT

Acoustic transmitter in particular for use in offshore seismic explorations, having sound-emitting surfaces (1, 2) being adapted to be subjected to vibrational movement by means of a drive unit (21) through at least one push element (22A, 22B) and two plate-like end pieces (3, 4) which are connected to the sound-emitting surfaces. The sound-emitting surfaces are formed by two curved plate members (1, 2) being of comparable width and heigth dimensions. The end pieces (3, 4) have a generally rectangular shape with a first pair of opposing side edges connected (5, 6, 7, 8) to end portions of the plate members (1, 2). Another pair of side edges on each end piece (3, 4) as well as side edges of the plate members engage two side plates (9, 10) which at either side closes the acoustic transmitter, preferably in a tightly enclosing manner.

26 Claims, 2 Drawing Sheets

ACOUSTIC TRANSMITTER

This invention relates in general to acoustic transmitter sources for emitting sound waves in water, in particular low-frequency sound waves e.g. for use in offshore seismic explorations. Such sources, beeing employed for generation of sound waves in water, are referred to under various terms, such as seismic transmitters, flextensional transmitters or acoustic pingers, cf. also Sonar.

The acoustic source according to the invention can with advantage find uses in connection in such sound or tone transmitters, whereby the soundwaves emitted into the water can be reflected from the sea bottom and underlying geological formations, with subsequent listening or detection by means of hydrophones or geophones of various types.

The invention is particularly directed to a special design of sound-emitting casing surfaces or shells in acoustic transmitters, and the design described here can be considered more or less related to certain forms of flextensional transmitters.

Flextensional transmitters are described in many publications, and one example is L. H. Royster: "The flextensional concept. A new approach to the design of underwater acoustic transducers" Appl.Acoust. 3 (1970) p. 117–226. Other examples are G. Bromfield: "Class IV flextensional transducers", Proceedings Second International Workshop on Power Transducers, Toulon, France, June 1990, and in G. Bringham and B. Glass: "Present status in flextensional transducer technology", J. Acoust. Soc. A., 68(1980), p. 1046–1052.

The known flextensional shell principle is based on volume changes in a vibrating ellipsoidic shell. When the long axis of an ellipsoid is put into vibration, the length of the short axes thereof will also vibrate, but with a much larger amplitude. This implies that the ellipsoidic shape leads to an efficient generator of acoustic energy at low frequencies. In general the fundamental resonance frequency of the ellipsoidic shell is so low that the length thereof is small, compared to the wavelength in water.

A limiting factor in this type of shell is the mechanical stresses to which the shell is subjected when large vibrational amplitudes are desired. Normally aluminium or glass fiber reinforced plastic materials are employed as the shell material. The use of such shells is also restricted as a consequence of the complicated shapes that these shells have, which leads to complicated manufacturing methods.

A particular example of a complex shape that in appearance and in function deviates rather strongly from the above discussed elliptical, round shells (egg shape), are hyperbolic, round shells. The advantage of this particular shape consists therein that the short axes will vibrate in-phase with the long axes. An embodiment based on this principle is described by D. F. Jones and C. G. Reithmeier: "Low frequency barrel-stave projectors" (Proceedings UDT 93, Nice, France, Microwave Exh. & Pub. Ltd. 1993, pp 251–253).

The latter embodiment in short comprises octagonal end plates joined to eight rod-shaped elements having a concave curvature and being placed in an essentially circular or polygonal arrangement about an axis of symmetry. A significant problem with this structure is the high number of gaps between the rod elements, associated with the question of sealing and possible contact between these elements.

This invention has for an object to provide an improved acoustic transmitter which by a simpler and more favourable structure than the previously known designs, gives a more reliable transmitter unit which at the same time has a high acoustic efficiency.

Thus in view of the known techniques discussed, the invention takes as a starting point an acoustic transmitter with sound-emitting surfaces having in the principle a concave configuration and being adapted to be excited into vibrational movement by means of a drive unit which activates the sound-emitting surfaces through the intermediary of at least one push element and two plate-like end pieces being connected to the sound-emitting surfaces.

What is novel and specific in the acoustic transmitter according to the invention in the first place consists therein that the sound-emitting surfaces are formed by two curved, membrane-like plate members having width and heigth dimensions of comparable order of magnitude and being arranged back to back, that the plate-like end pieces have a generally rectangular shape with a first pair of opposed side edges connected to end portions of the plate members, and that another pair of side edges on each end piece and side edges on the plate members engage two side plates which on either side encloses the acoustic transmitter, preferably in a thightly enclosing manner.

The solution presented here involves a high degree of freedom with respect to structure, dimensions and acoustic power, since it is possible to freely select the material in the plate or shell members, and a drive unit based on different systems or principles. The plate members constituting the shell, can advantageously be made of steel, aluminium or glass fibre reinforced plastic materials.

Figure 2:
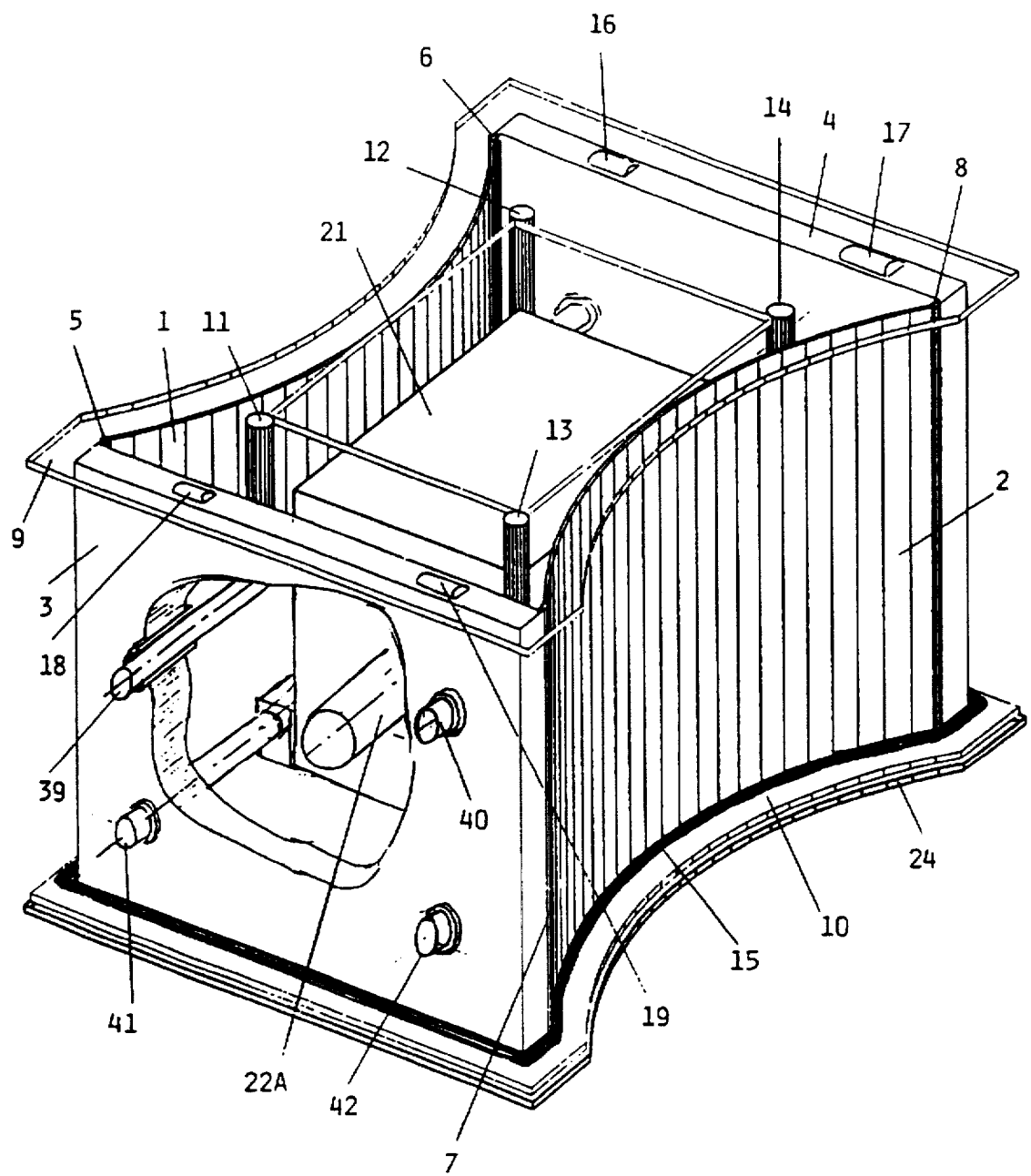

In the following description the invention will be explained more closely with the reference to the drawings, where:

FIG. 1 highly schematically and simplified shows a longitudinal section through an embodiment of the acoustic source according to the invention, and FIG. 2 in perspective view and in part somewhat more detailed shows important main components included in the acoustic source of FIG. 1.

In the exemplary embodiment shown here the main shape of the acoustic source or transmitter is given by the assembly and cooperation of several plate-shaped parts. In the first place there is here the question of primary sound-emitting surfaces or shell surfaces in the form of two elastic, membrane-like plate members 1 and 2, having both a concave curvature, so that they may be considered to be arranged back to back in the acoustic source. Moreover the structure comprises two end plates or end pieces 3, 4, which by means of four hinge connections 5, 6, 7 and 8 are connected to respective end portions of the pair of plate members 1 and 2.

The plate members or membranes 1 and 2 have a rectangular or possibly square shape, i.e. with width and height 5 dimensions of comparable order of magnitude. The curvature of the membrane plates 1 and 2 lies in one plane, and it is preferred that the curvature substantionally follows a hyperbola. Regarding the relative width and heigth dimensions of plate members 1 and 2 it is obvious that these can deviate a good deal from a square fundamental shape, but it will be realized that a much elongated rectangular shape in one or the other direction, is not advantageous.

As an alternative to the hinge connections 5, 6, 7 and 8 shown, the end pieces 3 and 4 can be connected to the plate members 1 and 2 in other ways, for example by means of an elastic piece of material which in itself provides for the desired flexibility, or even by designing the end pieces and the plate members as integral parts, where elastic deformation in the junction or end portions is adapted to make possible the vibrational movements which occur during operation of the acoustic source or transmitter.

On either side of the membrane plates 1, 2 and the end pieces 3, 4 there are mounted two inner side plates 9 and 10, the spacing of which is adapted to the width of the membrane plates and the end pieces, and is determined by a number of distance elements in the form of distance rods 11, 12, 13 and 14, the ends of which are secured to the pair of side plates 9 and 10. For a better illustration of other parts of the structure, the side plate 9 in FIG. 2 is shown as if it were transparent. At side edges of the two end pieces there are provided supporting rollers or wheels 16, 17, 18, 19 (see FIG. 2) adapted to run against the inner surface of the inner side plates 9 and 10. These side plates can be provided with grooves for the rollers 16, 17, 18 and 19. Obviously these wheel or roller means can be provided in the form of other types of friction reducing elements, for example on the basis of a slide effect.

At 15 in FIG. 2 there is illustrated a sealing element, for example in the form of a rubber profile, so as to obtain a sealed connection between the side plate 10 concerned and the adjacent side edges of the end pieces 3, 4 and the membrane plates 1 and 2 respectively. Thus there will be provided a closed transmitter unit having a unique shape and function, with main features according to this invention.

Rubber seals 15 (being present at both side plates 9 and 10) are flexible in order to allow both end pieces 3, 4 and the membrane plates 1, 2 to move in the plane of the inner side plates during operation of the source, i.e. with the vibrational movements being then generated.

Outside the inner side plates 9 and 10 and on either side there is mounted an additional outer side plate 24 (shown only at the inner side plate 10 in FIG. 2). These outer side plates serve, inter alia, for the mounting of external drive motors and the like, not being shown in the figures of drawings. By disassembling one or both of the outer side plates 24, access is obtained to the interior of the source structure in a favourable practical way, through suitable and possibly closeable openings in the inner side plates 9 and 10. Between the double side plates at each side there are provided sealing elements (not shown) which contribute to disassembly and removal of the outer side plates 24 in a simple manner, whereby this will have no influence on the rubber seals 15 referred to above.

A drive unit 21 with associated frame 20 constitutes central component in this acoustic source, whereby the drive unit through rod-shaped push elements 22A and 22B serves to set up vibrational movement in membrane plates 1 and 2 through the two end pieces 3 and 4. At this point it can be mentioned that even though the emission of sound mainly takes place from the membrane plates 1 and 2, the outer surfaces of the end pieces 3 and 4 will also to some degree contribute to sound emission during operation, since these surfaces apparently will also be subjected to vibrational movement.

It is an advantage to have the frame 20 for the drive unit mounted to at least some of the distance elements 11, 12, 13 and 14 shown, so that the drive unit 21 will be supported by these. Moreover the frame and the drive unit has no rigid connection to the end pieces 3, 4 or the membrane plates 1, 2. Thus the frame 20 with the drive unit 21 will "float" inside the source structure, i.e. the drive unit with its frame will not be subjected to any significant mechanical stress during operation. As will be described more closely below, the drive unit 21 with its frame 20 will have a mechanically biassed condition as a result of spring devices being incorporated in the structure.

As will be best seen from FIG. 1 the above mentioned push rods or elements 22A and 22B extend centrally and axially through the acoustic source, and this longitudinal axis can be regarded as coincident with the long axis of the hyperbola-shaped membrane plates 1 and 2, whereas the axis of the push elements 22A and 22B represents an axis of symmetry in the structure. Push elements 22A and 22B are excited to vibrational movements in their longitudinal direction by means of drive unit 21, which operates at a desired frequency for the acoustic source. As a drive unit 21 there can be employed devices of various types, for example known types based upon piezo-electric or magnetostrictive effect. A preferred form of drive unit, however, is the one which is the subject of Norwegian Patent Application No. 93.0916. The electric drive motor for the latter drive unit in such case advantageously can be located outside the box-like structure formed by the main components of the source in this embodiment, as illustrated most completely in FIG. 2.

As described more closely in the co-pending patent application Ser. No. 08/750,162 (PCT/NO95/00071), an acoustic source of the type concerned here, comprises with advantage, an adjustable spring device, namely being in the first place associated with push elements 22A and 22B (see FIG. 1). In this example the push elements extend freely through openings in end pieces 3 and 4, as for example illustrated at the opening 22C for push element 22B in end piece 4. The two push elements act each on an associated end piece 3 and 4 through compression springs 27 and 28 respectively, the compression of which can be controlled by means of associated hydraulic cylinders 25 and 26. In this connection it is of significance that the spring elements 27 and 28 have a non-linear characteristic, so that the spring constant will be adjustable by means of the hydraulic cylinders 25 and 26.

In FIG. 1 there are also shown additional rod-shaped elements 39 and 40 between the two end pieces 3 and 4, and these elements 39 and 40 are tension elements. Thus they are subjected to tensional stress and thereby are included in a balanced system together with the plate members 1 and 2, which also take up axial forces in the assembled arrangement. FIG. 2 partially shows the four tension elements 39, 40, 41 and 42. Tension elements 39 and 40 also act on end pieces 3 and 4 through compression springs 35, 36 and 37, 38 respectively, as will be seen from FIG. 1. Furthermore the middle portion of each of the tension elements 39 and 40 have their hydraulic cylinder 31 and 32 respectively, which according to the figure of drawing are located at the side of drive unit 21 and frame 20, but is not connected thereto. As shown at 39A both tension elements 39 and 40 also pass freely through openings in end pieces 3 and 4. Arrows in both directions, as shown for example at 22X, serve to illustrate adjustment possibilities for all elements 22A, 22B, 39 and 40, being extended between end pieces 3 and 4, and comprising hydraulically controllable spring elements.

It is explained more closely in the above co-pending patent application how this controllable spring arrangement makes possible an adjustment of resonance or improved impedance matching when generating low-frequency sound waves in water. In this connection it is desireable to give the membrane or plate members 1 and 2 a mechanical bias, which is provided for by the spring devices described for push elements 22A and 22B. The hydraulic sylinders 25 and 26 makes it possible to obtain effective elongation or shortening of the push elements, so that the mechanical bias can be regulated. As an alternative to hydraulic cylinders in this structure, for example purely mechanical devices may be contemplated, such as screw devices.

It is of course possible to modify the design of the transmitter or source structure in many ways in relation to what is described above with reference to the figures of drawings. In addition to variation of the choice of materials, hinge designs, inner and outher side plates as well as the dimensional relationship between the plate members 1,2 and end pieces 3,4, it is possible to configure the actual curvature or profile of the plate members in many other ways and with a hyperbolic shape as described. The curvature can be circular or elliptic or even be in the form of an edged profile, with a number of more or less planar plate pieces being bent along lines extending transversally of the plate members, i.e. in parallel to the plane of the end pieces. The membrane or plate members thus can be built up of various plate profiles in order to obtain desired properties. There may even be contemplated using plate members which have a pivotable link or transverse hinge at their middle portion, so that they are no longer able to take up forces in the axial direction of the transmitter unit, except for such forces that will occur upon immersing of the acoustic transmitter in water, with a resulting external water pressure.

We claim:

1. Acoustic transmitter in particular for use in offshore seismic explorations, with sound-emitting surfaces (1, 2) having in the principle a concave configuration and being adapted to be excited into vibrational movement by means of a drive unit (21) which activates the sound-emitting surfaces through the intermediary of at least one push element (22A, 22B) and two plate-shaped end pieces (3, 4) being connected to the sound-emitting surfaces, whereby the sound-emitting surfaces are formed by two curved, membrane plate members (1, 2) the width and height dimensions of which being of comparable order of magnitudes and being arranged back to back, the plate-shaped end pieces (3, 4) have a generally rectangular shape with a first pair of opposed side edges connected (5, 6, 7, 8) to end portions of the plate members (1, 2), and another pair of side edges of each end piece (3, 4) as well as side edges on the plate members engage two side plates (9, 10) which on either side encloses the acoustic transmitter, in a tightly enclosing manner, at least two transverse distance elements (11, 12, 13, 14) being provided between the side plates (9, 10), and a frame (20) being attached to at least some of the distance elements (11–13), so as to support at least a portion of the drive unit (21), whereas otherwise the frame has no rigid connection to the end pieces (3, 4) or the plate members (1, 2).

2. Acoustic transmitter according to claim 1, characterized in that each of the plate members (1, 2) are curved in a plane substantially according to a hyperbola and that the plate members are positioned essentially symmetrically in relation to a central axis (22A–22B) through the end pieces of the acoustic transmitter.

3. Acoustic transmitter according to claim 1 or 2, characterized in that the end portions of the plate members (1, 2) are flexibly connected to the end pieces (3, 4) preferably with a pivotable connection, e.g. a hinge connection (5, 6, 7, 8).

4. Acoustic transmitter according to claim 1, characterized in that friction reducing elements, e.g. slide elements or preferably roller elements (16, 17, 18, 19) are provided between the end pieces (3, 4) and the side plates (9, 10).

5. Acoustic transmitter according to claim 1, characterized in that sealing elements (15) are provided between the side edges of the plate members (1, 2) and adjacent side plates (10).

6. Acoustic transmitter according to claim 1, characterized in that dual side plates (10, 24) are provided at either side of the end pieces and the membranes.

7. Acoustic transmitter according to claim 1, characterized in that there is provided a non-linear spring element (27, 28) having a controllable (25, 26) spring constant, between at least one end of at least one push element (22A, 22B) and the associated end piece (3, 4).

8. An acoustic transmitter for use in offshore seismic exploration, comprising:
    sound-emitting members having a curved shape defining bight portions of the sound-emitting members, end portions of the sound-emitting members, and curved edges of the sound-emitting members;
    at least two end members having a first edge connected to a first end portion of the sound-emitting members and a second edge connected to a second end portion of the sound-emitting members;
    at least two side members sealed with the curved edges of the sound-emitting members;
    a frame rigidly attached to the at least two side members;
    a drive member supported by the frame; and
    at least one push element having a first end and a second end, the first end of the push element being connected axially to the drive member and the second end of the push element being connected to an end piece, wherein movement of the drive member is transmitted through at least one push element to at least one end member.

9. An acoustic transmitter as in claim 8, wherein a cross-section of said sound-emitting member is curved in the shape of a parabola.

10. An acoustic transmitter as in claim 8, where in the bight portions of the sound-emitting members are closer together than the end portions of the sound-emitting members.

11. An acoustic transmitter as in claim 8, where in the end portions of the sound-emitting members are flexibly connected to the end members.

12. An acoustic transmitter as in claim 8, wherein the end members comprise edges sealingly connected to the side members.

13. An acoustic transmitter as in claim 12, further comprising friction reducing elements positioned between the side members and the edges of the end members.

14. An acoustic transmitter as in claim 13, wherein said friction reducing elements comprise rollers.

15. An acoustic transmitter as in claim 8, further comprising at least one secondary side member connected to at least one of said side members to form a dual side member.

16. An acoustic transmitter as in claim 8, further comprising a non-rigid movement connection between the at least one push element and the end member.

17. An acoustic transmitter as in claim 16, wherein said non-rigid movement connection comprises a spring element.

18. An acoustic transmitter as in claim 8, further comprising a tension member connected between said end members.

19. An acoustic transmitter as in claim 18, wherein said tension member is connected to both the first end member by a non-rigid connection.

20. A process for generating a marine seismic source signal with a transmitter having a first and a second axis, including at least two moveable sound-emitting members positioned and arranged for movement along the second axis and a drive member positioned and arranged for movement along the first axis, wherein the movement along the first axis is transmitted into movement of the at least two moveable sound-emitting members, the process comprising:
    moving the drive member along the first axis with a drive unit;

moving the at least two moveable sound-emitting members along the second axis in response to the movement of the drive member along the first axis; and holding the drive unit in a spaced apart relation to the at least two moveable sound-emitting members wherein said holding substantially isolates the drive member from strain from pressure changes outside the transmitter.

21. A process as in claim 20, wherein said holding comprises holding said drive unit in a frame connected to at least two transverse distance elements having ends attached to at least two side members.

22. A process as in claim 20, further comprising transmitting movement along the first axis to the at least two sound-emitting members through a substantially non-rigid connection between a drive member and a substantially rigid end member.

23. A process as in claim 22, further comprising transmitting movement of the substantially rigid end member to the at least two sound-emitting members.

24. A device for generating a marine seismic source signal with a transmitter having a first and a second axis, including at least two moveable sound-emitting members positioned and arranged for movement a long the second axis and a drive member positioned and arranged for movement along the first axis, wherein the movement along the first axis is transmitted into movement of the at least two moveable sound-emitting members, the device comprising:

a drive unit for moving the drive member along the first axis;

a means for moving the at least two moveable sound-emitting members along the second axis in response to the movement of the drive member along the first axis; and a means for holding the drive unit in a spaced apart relation to the at least two moveable sound-emitting members wherein said holding substantially isolates the drive member from strain from pressure changes outside the transmitter.

25. A device as in claim 24, wherein said means for holding comprises a frame connected to at least two transverse distance elements having ends attached to said side members.

26. A device as in claim 25 further comprising a substantially non-rigid connection between a drive member and a substantially rigid end member.

* * * * *